United States Patent [19]

Wesley

[11] 4,059,477

[45] Nov. 22, 1977

[54] BOX END LABELING APPARATUS

[75] Inventor: John George Wesley, Forest Park, Ill.

[73] Assignee: Labelette Company, Forest Park, Ill.

[21] Appl. No.: 690,259

[22] Filed: May 26, 1976

[51] Int. Cl.[2] .................. B32B 3/04

[52] U.S. Cl. .................. 156/479; 156/212; 156/216; 156/488

[58] Field of Search ........ 156/212, 216, 443, 475–477, 156/486–492, 520, 521, 522, 461, 467–468, 479; 53/198 R

[56] References Cited

U.S. PATENT DOCUMENTS

| | | | |
|---|---|---|---|
| 1,343,264 | 8/1920 | Gwinn | 156/487 |
| 1,467,018 | 9/1923 | Tzibides | 156/477 R |
| 1,469,420 | 10/1923 | Leibing et al. | 156/216 |
| 1,746,988 | 2/1930 | Brautigam | 156/486 |
| 1,869,374 | 8/1932 | Jahne | 156/487 X |
| 2,087,472 | 7/1937 | Dyment | 156/487 X |
| 2,809,141 | 10/1957 | Biddison | 156/477 R |
| 2,854,164 | 9/1958 | Triolo | 156/477 R |
| 3,832,829 | 9/1974 | Stout | 53/198 R |
| 3,868,289 | 2/1975 | Beard et al. | 156/486 X |

*Primary Examiner*—David A. Simmons
*Attorney, Agent, or Firm*—McWilliams & Mann

[57] ABSTRACT

An apparatus for applying labels to box ends, to achieve both securement and labeling of both box ends, in which the apparatus defines a processing way having entrance and exit ends along which is disposed an endless conveyor formed to define equally spaced seats for receiving and sequentially conveying along the way the boxes to be labeled, with the boxes disposed transversely of the way. The apparatus includes a labeling station through which the boxes are initially moved, and at which each box has applied to the underside of each end of same one end of a label having glue applied thereto and oriented to parallel the box and project endwise and outwardly of same a sufficient amount for bending around the box end (to which it is attached) for engagement with and securement to the top side of the box. The box is then sequentially moved through a label folding station at which the boxes at each end of the box are first wiped into adherence with the box end, and then are wiped into adherence with the top side of the box. The apparatus is made up of fixed and movable modules that operate on the respective box ends, with the movable module being adjustably mounted for movement relative to the fixed module to accommodate labeling of boxes of different sizes.

4 Claims, 7 Drawing Figures

BOX END LABELING APPARATUS

This invention relates to an apparatus for separately labeling either end of packaging boxes, and more particularly, to an apparatus for simultaneously labeling both ends of a closed box with separate labels at each end of the box, and on a mass basis.

Many products are packaged for sale or shipment in boxes of the familiar six sided parallelepiped type formed from baseboard or the like. A common practice is to complete the packaging by closing the box ends with tape or the like, to avoid complete wrapping of the box with wrapping paper or the like.

A principal object of the present invention is to provide an apparatus for effecting secure closure of packaging boxes by separately applying labels at either end of the box.

Another principal object of the invention is to provide an apparatus for overlabeling both ends of boxes (of the type indicated) with separate labels, and on a mass basis.

Yet other objects of the invention are to provide a an apparatus for applying separate labels to either end of a packaging box that performs on a mass basis and accommodates variant box sizes, and to provide an apparatus of the type indicated that provides for economical and facile box end labeling.

In accordance with the present invention, an apparatus are provided contemplating a processing way having an entrance end an exit end along which is disposed a conveyor arrangement, which may conveniently be of the endless conveyor type, formed to define equally spaced seats for receiving and sequentially conveying the boxes to be labeled along the way for processing in accordance with the invention, with the boxes disposed transversely of the way so that the box ends extend normally of the direction of conveyance.

The apparatus includes a labeling station through which the boxes are initially moved, at which each box has applied to the underside of each end of same one end of a label that has glue applied thereto and that is oriented to parallel the box and project endwise and outwardly of the box a sufficient amount for bending around the box end to which the label is adhered, for engagement with the top side of the box. The boxes then are sequentially moved to a label folding station at which the labels at each end of the box are first wiped into adherence with the respective box ends, and that are wiped into adherence with the top side of the box to complete the overlabeling of the respective labels with respect to the respective box ends. The conveyor moves the labeled boxes to a discharge position at the exit end of the way, with similar boxes being introduced at the entrance end of the way for labeling in like manner.

The apparatus is arranged in fixed and movable modules that respectively cooperate with the respective box ends, with the movable module being adjustably mounted to accommodate varient lengths of boxes to be labeled.

Other objects, uses and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the Patent Laws, and that the invention is susceptible of other embodiments that will be obvious to those skilled in the art, and are intended to be covered by the appended claims.

GENERAL DESCRIPTION

Figure 3:
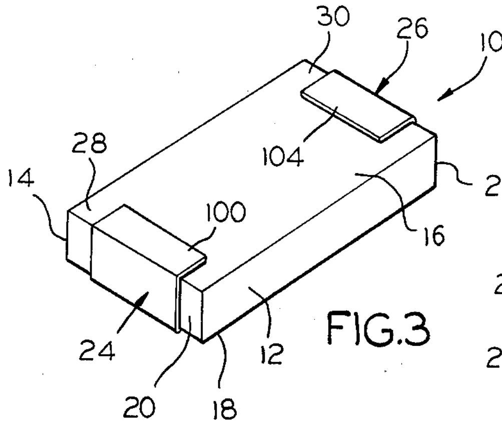
FIG. 3 is a perspective view illustrating a box labeled in accordance with the present invention.

Reference numeral 10 of FIG. 3 generally indicates a familiar form of packaging box having the usual six sided parallelepiped configuration which comprises in the form shown opposite sides 12 and 14, top side 16, bottom side 18, and end sides 20 and 22. Boxes of the type indicated are available in many forms, shapes and sizes and while either end or the top of the box, or both, may be formed to provide the box closing and opening panel or flap, when the box is closed it has the parallelepiped appearance indicated in FIG. 3.

In accordance with the present invention, labels 24 and 26 are applied to the respective ends 28 and 30 of the box in overlabeling relation thereto. Thus, the label 24 is adhered to the box underside 18, the box end side or wall 20, and the box top side 16, while the label 26 is adhered to the box underside 18, the box end side 22, and the box top side 16 for firm securement of the box 10 in its closed relation, without requiring wrapping paper and the like to complete the packaging.

Figure 1:
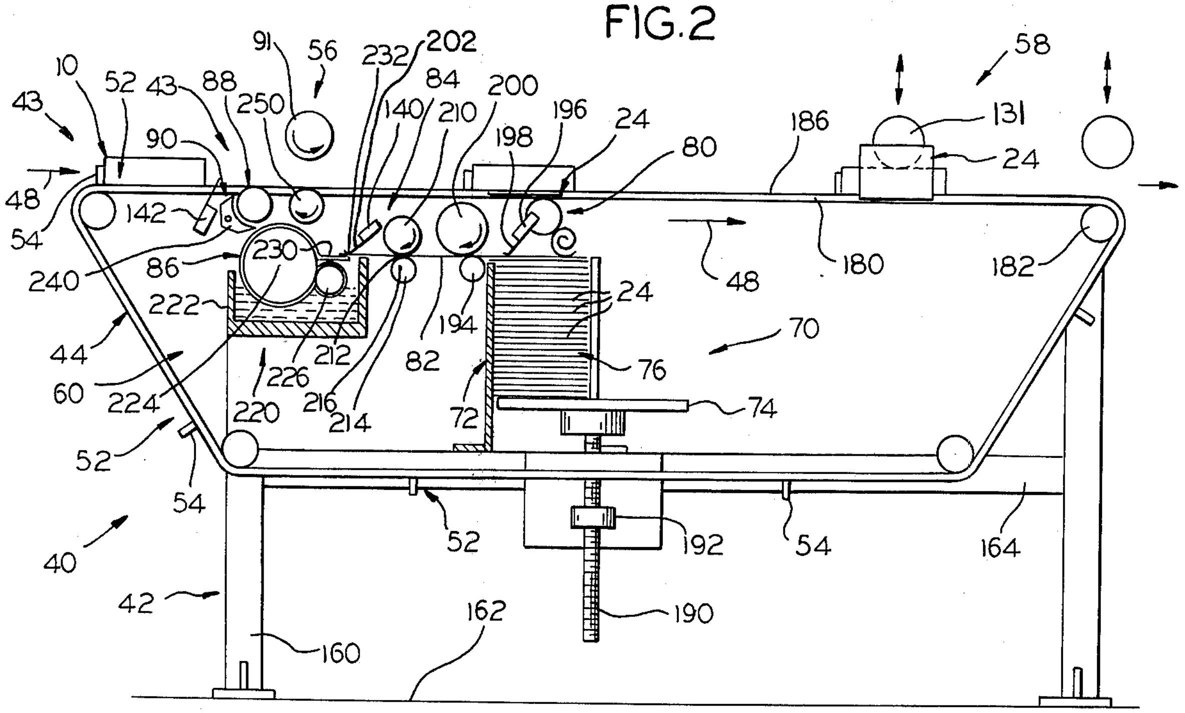
FIG. 1 is a diagrammatic side elevational view, largely in block diagram form, illustrating one embodiment of the invention.

In accordance with the invention, an apparatus 40 is provided that comprises a suitable frame 42 formed to define a processing way 43 through which boxes 10 are conveyed in sequence, as by employing endless conveyor 44 which in the form shown comprises a pair of endless bands or belts 47 and 49 separately trained and driven for simultaneously moving the bands or belts 47 and 49 in the directions indicated by the arrow 48 of FIG. 1. In the illustrated embodiment of the invention, the movement is intermittent and timed with the operation of a suitable supply conveyor 50 on which boxes 10 to be labeled are brought to the entrance end 51 of the way 43.

The endless conveyor 44 conveys the individual boxes 10 to be labeled through the way 43, in an intermittent manner, to the exit end 53 of the way, where when the boxes are discharged or suitably removed for storage or distribution.

The conveyor 44 defines a series of equally spaced seats 52 on which the respective boxes 10 are applied. In the form shown, the bands or belts 47 and 49 are driven in unison and each is identically equipped with equally spaced lugs 54 against which the individual boxes 10 are seated, to define the respective seats 52.

The appaatus 10 further contemplates a labeling station 56 to which the individual labels 24 and 26 are initially applied to the boxes being labeled, and a label folding station 58 where such labels are wiped into firm adherence with the respective box end sides and the box top side.

Figure 2:
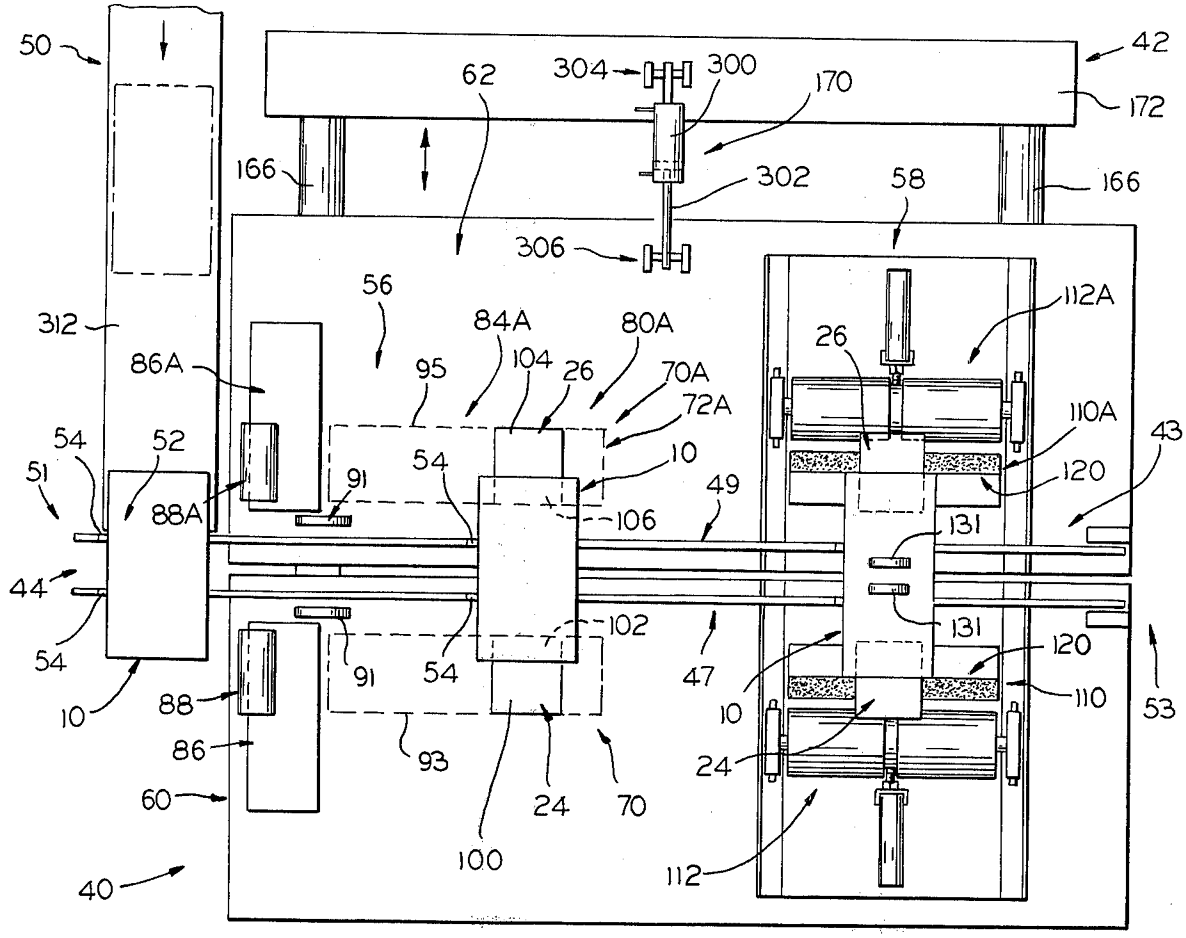
FIG. 2 is a plan view of the general arrangement shown in FIG. 1, again largely in block diagram form.

Further in accordance with the invention, the apparatus 10 is in the form of a fixed module 60 and a movable module 62, with the fixed module 60 being integrated with frame 42, and the movable module 62 movably mounted on same for movement toward and away from the fixed module 60, for instance, in the manner indicated in FIG. 2, for accommodating the processing of boxes 10 of varient lengths.

The modules 60 and 62 are of similar general arrangement, aside from the module 62 being movably mounted on frame 42. The general arrangement of the framing of these modules and the mounting of their specific components are largely optional and this is largely omitted in favor of the block diagram showing illustrated. Basically, each module contains identical components that are to be operatively associated with the respective ends of the boxes being processed.

Thus, the fixed module 60 comprises a label supply station generally indicated at 70 comprising a label hopper 72 including a vertically movable platform or elevator 74 on which rests a stack 76 of labels 24 that are to be applied to the end 28 of the box 10. The elevator 74 is arranged to maintain the uppermost label 24 at a predetermined elevation for cooperation with a first stage feed roller device or mechanism 80 and label support and guide plate 82, which supply the labels 24 one by one to a second stage feed roller device or mechanism 84, from which the labels 24 move in timed sequence to and across glue roller 86 (for applying glue to the individual labels), and from which the labels 24 are fed by feed roller 88 about guide device 90 for application to the individual boxes 10.

The movable module 62 is similarly equipped with components identical to those indicated in FIG. 1, most of which are omitted to simplify the drawings, but those that are illustrated are indicated by corresponding reference numerals having the suffix "A". Thus, the labels 26 are applied to the movable module 62 and, in particular, to its label supply station 70A, for supply to glue roller 86A through first and second stage feed roller devices or mechanisms identical to those indicated by reference numerals 80 and 84.

In accordance with the invention, the label supply stations 70 and 70A and the first and second stage feed roller devices of same (80, 80A, 84, 84A), together with the glue rollers 86 and 86A and feed rollers 88, 88A, are operated in synchronism, to effect simultaneous application of the labels 24 and 26 to the respective ends 28 and 30 of a container 10 as the container in question moves through the labeling station 56.

Further in accordance with the invention, the hoppers of the label supply station 70 and 70A are disposed such that the labels 24 and 26 move through the label feed paths indicated by the respective rectangles 93 and 95 (shown in dashed lines in FIG. 2), in moving from the respective hoppers 72 and 72A into adherence with the under or bottom side 18 of the respective boxes 10. It will be noted that with respect to this relationship, the labels 24 and 26 will be in substantial coplanar relation while moving the length of the respective paths 93 and 95, and when applied to the underside 18 of the box. The end 100 of the label 24 will lie substantially outside the vertical projection of the box 10 at its end 28, while the end 102 of the label 24 will underlie same to the extent that the label 24 is to be adhered to the underside 18 of the box. Similarly, the end 104 of label 26 lies outwardly of the vertical projection of the box 10, while its other end 106 underlies same to the extent that the label end 106 is to be adhered to the underside 18 of the box 10.

As applied to the individual boxes 10 at station 56, the labels 24 and 26 at their respective ends 102 and 106 are thus adhered to the box underside 18 as the result of the respective labels 24 and 26 being applied to the individual boxes by the operation of the invention at station 56. In such condition, the labels 24 and 26 are in substantially coplanar relation with their respective ends 100 and 104 projecting away from each other and outwardly and away from the respective box ends 28 and 30 a sufficient amount so that the respective labels 24 and 26 may be folded up flush against te respective box end sides 20 and 22, and then folded down against the box top side 16, for adherence thereto, in accordance with the invention.

These functions are performed at label folding station 58, which comprises in the case of fixed module 60 a box end wiping device or mechanism 110 and a box top side wiping device or mechanism 112 that are operative on the ends 28 of the individual boxes 10. The module 62 is equipped with identical box end wiping mechanism 110A and box top side wiping mechanism 112A for operative association with the ends 30 of the boxes 10.

In accordance with the invention, when a box 10 having labels 24 and 26 applied thereto in the manner indicated is at label folding station 58, the conveyor 44 dwells a time period of sufficient length to permit operation of the respective mechanisms or devices 110 and 112, 110A and 112A, with, in the preferred manner of operation, the devices 110 and 110A operating synchronously followed by synchronous operation of the devices 112 and 112A.

Figure 6:
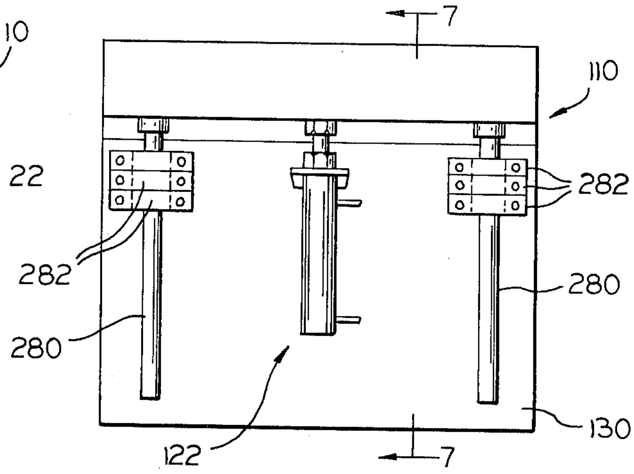
FIG. 6 is a view illustrating the principal components of the mechanism for folding the labels that have been initially applied to the box underside to an upright position whereby the position of FIG. 5 is obtained.
Figure 7:
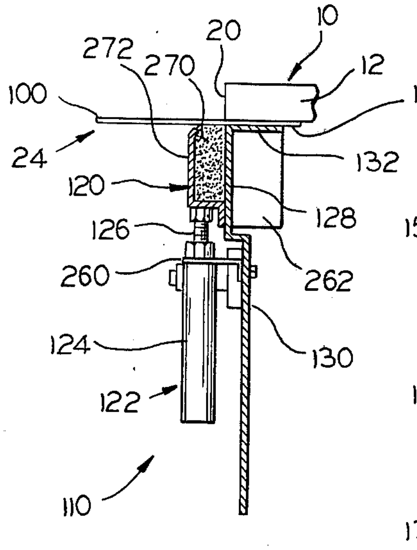
FIG. 7 is a sectional view taken substantially along line 7—7 of FIG. 6.
Figure 4:
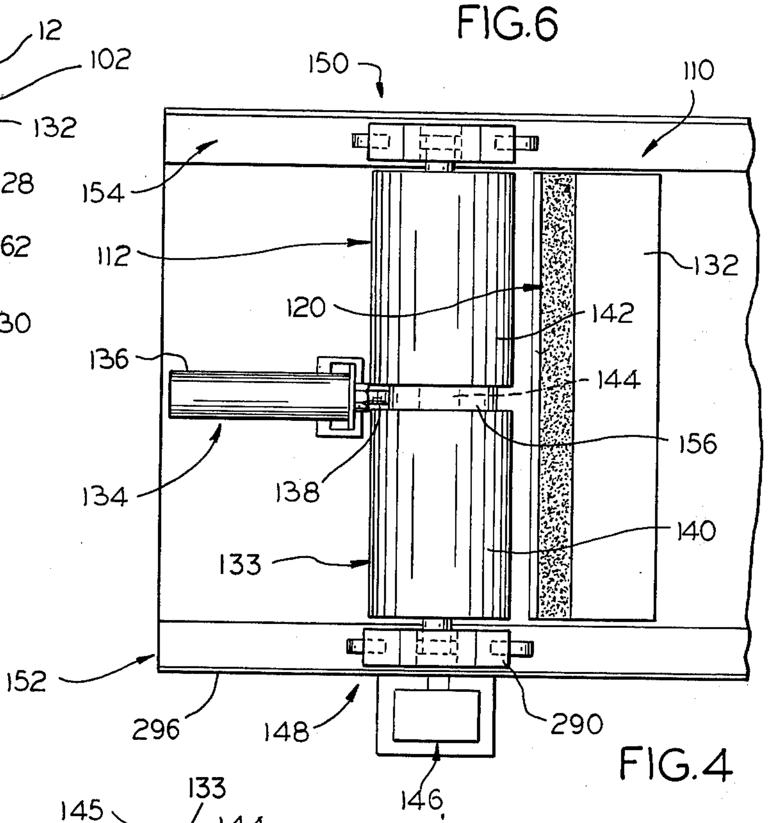
FIG. 4 is a plan view of one side of the label folding station shown in FIG. 2, but on an enlarged scale.
Figure 5:
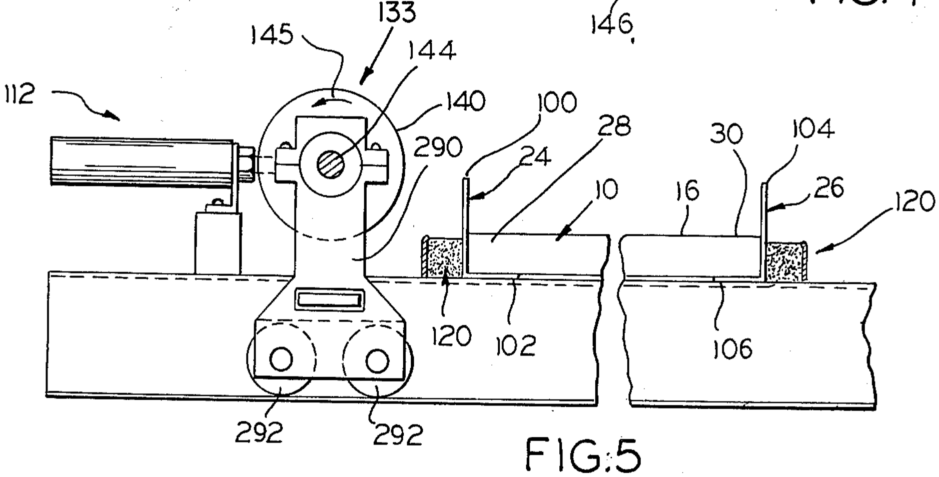
FIG. 5 is a side elevational view of the arrangement shown in FIG. 4, with a box being labeled having its end labels partially folded.

As indicated in FIGS. 4–7, the devices 110 and 110A each comprise a vertically disposed wiping member 120 formed from a suitable resiliently compressible sponge material, that is reciprocated vertically by suitable reciprocating device 122 (see FIGS. 6 and 7), which may be in the form of suitable air cylinder 124 having the usual piston (not shown) operatively mounted in same and equipped with piston rod 126 suitably connected to member 120 for moving same between the retracted position of FIG. 7 and the extended position of FIG. 5.

In accordance with the specific arrangement illustrated, the wiping member 120 is mounted to be compressed against pressure panel 128 of frame mounting plate on member 130 (see FIG. 7) which is integral with planar flange portion 132 over and along which the label equipped boxes 10 are conveyed by the conveyor 44 at station 58. As indicated in FIG. 2, when the individual boxes 10 are in their dwell period at station 58, the box is centered between the devices 110, 110A, 112 and 112A of the respective modules 62. The apparatus 40 preferably includes vertically movable rollers 131 that are brought to bear against the box 24 positioned at the station 58 in the manner indicated in FIGS. 1 and 2 for operation of the devices 110 and 110A. As indicated, the device 110A is identical to the device 110, and operated synchronously therewith, with the result that when the devices 110 and 110A are operated, their wiping members 120 move from the position of FIG. 7 to the position of FIG. 5 to fold the respective labels 24 and 26 against the respective box end sides 20 and 22, with the resiliently compressed nature of the wiping members 120 exerting a biasing action on the portions of the respective labels 24 and 26 that engage the end sides 20 and 22 that results in firm adherence of same thereto.

The devices 110 and 110A then retract to their positions in FIG. 7 for accommodating operation of devices 112 and 112A, each of which comprises a roller member 133 mounted for movement in a horizontal plane across and in wiping relation to the top sides 16 of the box 10 under the reciprocating action of reciprocating device 134 which may conveniently be in the form of air cylinder 136 having the usual piston (not shown) reciprocably mounted therein with its piston rod 138 operatively connected to the roller member 133 for reciprocating same. In the form shown, the roller member 133 is in the form of roller sections 140 and 142 received over and suitably keyed to shaft 144 (see FIG. 4) and rotated in the direction indicated by the arrow 145 of FIG. 5 by suitable drive motor 146 rotating shaft 144 in that direction. The shaft 144 is journaled between spaced trolleys 148 and 150 riding on the respective trackways or rideways 152 and 154 suitably mounted on the respective modules 60 and 62. Piston rod 138 is connected to, in the form shown, sleeve 156 that is received over rod 144 and separates the respective roller sections 140 and 142.

In accordance with the invention, the devices or mechanisms 112 and 112A come into operation when the labels 24 and 26 have been folded to the positions indicated in FIG. 5, whereupon the roller members 133 of the respective devices 112 and 112A are reciprocated first toward and then away from each other, with the roller sections 140 and 142 rotating in the direction indicated by the arrow 145 of FIG. 5, to effect a firm wiping action on the upstanding end portions 100 and 104 of the respective labels 24 and 26 for wiping same into firm engagement and adherence with the container top side 16. The wiping devices 112 and 112A after performing their wiping functions return to the retracted position of FIGS. 2 and 5. The conveyor 44 then becomes operative to move the freshly labeled container 10 to the exit end 53 of the way 43 for discharge and further handling.

It will thus be seen that the conveyors 50 and 44 are operated in an intermittent timed relationship, in association with the operation of the various devices and mechanisms indicated at the labeling station 26 and label folding station 58 to effect labeling of boxes 10 in sequence as the apparatus or machine 40 operates in accordance with the invention.

Assuming that the apparatus or machine 40 is set up to handle a quantity of the boxes 10 of identical size and configuration, the boxes 10 are supplied to the conveyor 50 in spaced intervals consistent with the operation of the conveyor 44 to effect placement of a box 10 on a seat 52 of conveyor 44 at a point in the operation of the conveyor 44 when it has a dwell period and a seat 52 is positioned as indicated in FIGS. 1 and 2 to receive a box 10 from conveyor 50. The boxes 10 may be mechanically or manually applied to the conveyor 44, as desired, but in any event, the individual boxes 10 should be applied to the seats 52 so that the box is centered on the conveyor 44 between its conveyor bands or belts 47 and 49. The first stage roller feed devices 80 of the respective modules 60 and 62 are operative to maintain a set of labels 24 and 26 at the ready position against timing switch 140 so that when conveyor 44 is operated to move container 10 into and through the labeling station 56, switch 142 is engaged to set into motion the second stage feed roller devices 84 which effect glue coating on such set of labels 24 and 26 to be applied to the oncoming box 10, and the feeding of such labels about guide device 90 and the rolling of same into adherence with the underside of the box 10 in question, as the box 10 in question moves across feed rollers 88 and through the labeling station 56. Feed rollers 91 operatively mounted above feed roller mechanism 84 of each module and driven in the direction indicated by the arrow of FIG. 1 may be applied to serve as a driving hold down device on the box 10 as it moves through labeling station 56.

The next dwell position of the conveyor 44 will dispose the freshly labeled box 10 in a position intermediate station 56 and station 58, as indicated in FIG. 1, at which point the subsequent box 10 to be labeled is applied to the following seat 52 of the conveyor 44. The next movement of the conveyor 44 moves the box 10 that is at the intermediate position shown in FIG. 2 to the label folding station 58 that is indicated in FIG. 1, with the hold down roller 130 then being lowered against the box 10 in question for operation of the devices 110, 110A and 112 and 112A that complete the application of the labels 24 and 26 to the box in question. The next movement of the conveyor 44 moves the freshly labeled box 10 to the exit end 53 of the conveyor 44 for discharge for further processing, as mentioned hereinbefore. The box seats 52 continue on around the conveyor 44 in endless conveyor manner for later reapplication thereto of boxes 10 to be labeled in the manner already indicated.

SPECIFIC DESCRIPTION

The frame 42 of the apparatus 40 in practice may be suitably arranged to accommodate the various mechanisms referred to. As shown, the frame 42 comprises suitable legs 160 resting on support surface 162 and integrated with suitable cross members 164 to define the basic framing of the frame 42 on which are suitably mounted the modules 60 and 62. For purposes of illustration, the frame 42 is shown as including spaced cross members 166 (see FIG. 2) that extend normally of the way 43 and have module 62 slidably mounted on same for adjusting movement toward and away from the module 60. The specific means of effecting the adjustment movemnt of the movable module 62 with respect to the fixed module 60 is optional, though for purposes of illustration hydraulic cylinder device 170 is illustrated suitably connected between the module 62 and a fixed portion 172 of the frame 42 for purposes of effecting the adjustment movement desired and locking same against movement when the module 62 is in the desired adjusted position. Of course, device 170 may be operated using conventional pressure liquid sources, valving, conduiting, etc. required for this purpose.

As the components of the stations 56, 58 and 70 are duplicated on the respective modules, and the conveyor band or belt 49 is separably but synchronously operated with conveyor section 47, adjustment of the module 62 with respect to the module 60, to accommodate boxes of variant lengths, may be effected without effecting the adjustability of the operating components of the machine through it is desired that the hold down rollers 91 and 131 that operate on the module 62 side of the machine be similarly adjustable, as will be apparent to those skilled in the art.

The conveyor bands or belts sections 47 and 49 each comprise an endless member 180 trained over suitable pulleys 182 and separately but synchronously driven in any manner suitable for conveyors of this type. The upper runs 186 of the be suitably supported by slider plates or the like that are not illustrated, as will be obvious to those skilled in the art. The conveyor bands or belts and associated parts thus form discrete conveyor sections of which the section mounted on module 62 may be moved toward and away from the conveyor section of module 60 to accommodate boxes of variant lengths.

As to the label supply stations, the elevator platforms 74 each include a threaded shaft 190 fixed thereto that is operably associated with suitable drive mechanism 192 including a nut structure (not shown) that is rotated in any suitable manner to maintain the uppermost label of the respective stacks 72 at the desired level relation with label support plate 82 and a fixed separator bar 194 under the control of switch 196 having switch arm 198 engaging the uppermost label of the stack controlled by the switch 196.

The feed roller device 80 is only diagrammatically illustrated as it may be of any suitable conventional nature, that shown including feed roller 200 suitably journaled and rotated in the direction indicated in FIG. 1 for feeding the respective labels from the top of the respective stacks across the separator bar 194 and label support plate into the "ready" position, in which the respective labels are in engagement with switch arm 202 of control switch 140 (of the respective stations 70).

The feed roller device 84 comprises an upper constantly rotating roller 210 journaled for operation above the window opening 212 formed in plate 82 under which is operably disposed an eccentrically mounted feed roller 214 that rotates about its own axis, which roller 214 is journaled to be swung about eccentric axis 216 against the periphery of the roller 210 when the labels 24 and 26 are to be moved by the respective feed roller devices 84 of the respective modules, from the ready position that such labels have been disposed at by the operation of feed roller devices 80, through a glue coater device 220 of which glue roller 86 forms a part. For this purpose, the operation of the feed roller devices 80 and 84 may be synchronized in timed association with operation of the conveyor 44 and other components of the machine in any suitable manner.

The glue coater device 220 of each module 60 and 62 comprises a glue supply pan 222 suitably mounted within the respective modules, which pan 222 contains a supply of suitable glue. Glue coating roller 86 is suitably journaled for rotation about axis 224 such that the lower portion of the rim of the roller 86 will run in the glue contained in pan 222. The roller 86 in particular and the glue coater device 220 in general are preferably arranged in accordance with the corresponding device disclosed in my U.S. Pat. No. 3,278,359 (the entire disclosure of which is incorporated herein by this reference), and thus roller 86 is formed to define a periphery having alternating grooves and ridges and is operably associated with groove clearing or cleaning roller 226 that is similarly provided with complementing grooves and ridges that are intermeshed with the corresponding grooves and ridges of the roller 86, whereby the grooves of the gluing roller 86 are cleared from glue as the ridges of this roller move upward and toward the glue coating position of the label surfaces thereby as they move across the glue coating roller 86.

Following the disclosure of my said U.S. Pat. No. 3,278,359 operably associated with roller 86 are a plurality of control fingers 230 that are disposed in each of the grooves of the gluing roller 86 and are mounted on a rock shaft 232 for elevation from a retracted position within the grooves of the roller 86 to a position where they are elevated somewhat above the roller ridges of this roller whereby the labels as passing across the glue roller may have portions of same selectively elevated above or out of contact with the glue roller to provide the skip gluing control contemplated by my said patent.

The guide device 90 comprises a series of spaced guide plates 240 shaped to guide the leading edges of the labels upwardly around the label feed roller 88 and into engagement with the undersides of the respective boxes, whereby the leading ends of the respective labels, which will have glue applied thereto, engage the underside 18 of the box to be labeled for adherence thereto. Glue may be applied to the individual labels along the lengths of same as seems to be adviseable or necessary for effective labeling of specific forms of boxes, through ordinarily both the leading and the trailing ends of the label would have glue applied thereto on the undersides thereof.

Of course, the roller feed device 80 and 84, the glue roller 86, and the label feed roller 88 are operated so that their peripheries have the same surface rotational speed as the speed of movement of the boxes 10 through the station 56, whereby the labels 24 and 26 to be applied to the respective boxes 10 move at the speed of movement of the boxes across the station 56. Also, the operation of conveyors 44 and 50 are suitably coordinated with the components at station 56, by using conventional techniques, such that the labels 24 and 26 are adhered to the individual boxes in the centered relation (relative to the box in question) that is indicated in the drawings.

Both modules 60 and 62 are equipped with separately journaled and driven drive rollers 250 opposing the clamping rollers 91, in the case of each module, to supplement the driving action applied to the individual boxes through the labeling station, as desired; such rollers 250 are discrete as to each module.

Turning now to the wiping devices 110 and 110A, the mounting plates 130 are suitably connected to the respective modules in any convenient manner and have the cylinder devices 122 connected thereto by suitable brackets 260. The flanges 132 of the mounting members 130, in the form shown, extend between the trackways 152 and 154 of the devices 112 and 112A and are disposed to position the boxes 10 when centered in station 58 to dispose the outwardly directed end portions 100 and 104 of the respective labels in overlying relation to the wiper members 120, as indicated in FIG. 7. The flange 132 may be braced at either end of same by suitable webs 262, against the operation of the respective hold down rollers 130.

The wiper member 120 in the form shown comprises a rectilinear body 270 formed from a suitable commercially available synthetic cellulose sponge material that is relatively soft; body 270 is suitably affixed, by bonding or the like, to backing member 272 that is suitably secured to the piston rod 126 of the respective devices 122. As already indicated, the body 270 is to be under compression against and in sliding relation with pressure panel 128 and the mounting of the wiper member 120 is oriented with this purpose in mind. The boxes are placed in and moved by conveyor 44 so that their respective end sides 20 and 22 will be in substantial coplanar relation with the respective surfaces 273 of pressure panels 128, so that the sponge material of the respective bodies 270 will press against the respective labels 24 and 26 as wiper members 120 move from the position of FIG. 7 to the position of FIG. 5.

As indicated in FIG. 6, the wiper member 120 of each device 110, 110A has secured thereto in spaced apart relation a pair of guide members 280 that slidably operate within suitable guide elements 282 secured to the mounting member 130.

With regard to the wiping devices 112 and 112A, the trolleys 148 and 150 are in the form of suitable frame members 290 journaling suitable wheels 292 that ride on the respective rideways 152 and 154. The drive motor 146 which is only diagrammatically illustrated, is mounted on one of the trolleys in any suitable manner.

The trackways 152 and 154 in the form shown are defined by suitable angle members 296 suitably fixed to the respective modules 60 and 62 in the positions indicated in the drawings.

It will therefore be seen that the invention provides for simultaneous labeling of both ends of a box 10 on a mass basis by an apparatus and method that are adapted for ready adjustment to accommodate boxes of variant lengths. As a matter of practicality, it is preferred that in using the invention the boxes to be labeled be grouped according to size and length and then the individual box groups processed individually to permit the setting of the machine to accommodate a number of boxes of the same size and length. Setting of the machine to accommodate boxes of different lengths involves merely appropriately adjusting the movable module 62 with respect to the fixed module 60. Boxes of variant widths can be accommodated by employing conventional adjusting arrangements for the machine stations that have been disclosed. Similarly, conventional arrangements may be employed to accommodate the use of labels of variant sizes.

Hydraulic cylinder device 170 as shown comprises suitable hydraulic cylinder 300, having the usual piston and piston rod assembly 302, connected between lug sets 304 and 306 of the frame 40 and module 62, and suitably operated and controlled to provide the adjustability of module 62 relative to module 60, that is needed. The device 170 is shown as examplary only as there are many ways in which the positioning of module 62 can be effected within the skill of the art.

The invention permits boxes of the type illustrated to be closed by only labeling both ends of same, and, of course, the labels employed may be solely for that purpose, and they may also bear suitable identifying indicia including trademarking and the like. It will also be apparent that the invention may be alternately employed to label only one end or the other end of the boxes 10.

In one commercial embodiment of the invention the machine is set up to handle box lengths of 12 to 44 inches, box widths of 5 to 12 inches, and box height of 1 to 2 inches, with a labeling production of 10 to 15 boxes per minutes.

Conveyor 50 is diagrammatically illustrated as a conveyor belt 312, and may be of any suitable type and suitably operated to provide the intermittent supply of boxes 10 to conveyor 44 that is contemplated by this invention.

The switching and other controls of apparatus 40 may be integrated in a suitable control system, such as one similar to that disclosed in my said patent, to provide the timing relationships contemplated by the invention and suitable operator control. A dwell time of three seconds is employed, in a commercial embodiment of the invention, for operation of conveyor 44, with the other components disclosed being suitably controlled for coordinated operation therewith.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A machine for simultaneously overlabeling both ends of a box of parallelipiped configuration, said machine comprising:
   - a processing way having entrance and exit ends,
   - means for conveying the box to be labeled longitudinally of said way including means for disposing the box to extend transversely of said way whereby the box ends project to either side of said conveying means,
   - said way including a labeling station and a label folding station in spaced apart relation therealong,
   - a label supply station for each box end and means for feeding a label from the respective label supply stations to said labeling station,
   - said label supply stations and said label feeding means for each box end being located relative to said conveying means to dispose the labels for each box end to have one end of same projecting toward the way and underlying the path of movement that the box end to be labeled thereby has when the box is moved along said way by said conveying means, and to have the other end of same project laterally of said way and said path endwise of the box end and away from said way and beyond said path, whereby the labels for each box end extend transversely of said way,
   - said labeling station including means for applying glue to the underside of the respective labels when received from said label supply station and means for rolling the respective said one ends of the respective labels onto the underside of the box at either end of same as the box is moved through said labeling station,
   - said label folding station including means for consecutively wiping the respective labels flush against said box ends for adhering same thereto, and for wiping the labels flush against the top side of the box for adhering same thereto,
   - said means for wiping the respective labels flush against said box ends comprising for each box end comprising:
   - a vertically movable wiping member mounted for reciprocating movement between a retracted position below the level of said paths to an elevated position projecting above the level of said paths,
   - said label folding station further including for each wiping member a generally planar pressure panel disposed vertically and paralleling said way,
   - said panels being respectively mounted and positioned in vertical alignment with and beneath the respective paths of movement of the respective box ends and defining rectilinear top edges horizontally disposed and substantially aligned with the level of the underside of the box when the box is positioned at said label folding station between said panels, said wiping members each including a resiliently compressible pad defining a sliding wiping surface disposed to bear compressively against the respective panels when said wiping members are in their retracted positions, and to bear compressively against the respective box ends when said wiping members are in their elevated positions, means for moving said wiping members between their said positions for slide wiping the respective labels flush against said box ends when the box is at said label folding station, means for holding the box that is at said label folding station against vertical movement on movement of said wiping members to their said elevated positions, said means for wiping the respective labels flush against the top side of the respective boxes at said label folding station comprising for each box end to be labeled:

a horizontally movable roller mounted for reciprocating movement in a plane level with the level of the top sides of the boxes, as they are disposed along the path of movement of the respective box ends, between a retracted position to one side of the way and an extended position overlying the way wherein said rollers ride on the top sides of the respective boxes when at said label folding station, and means for reciprocating said rollers between said positions for wiping the respective labels against the top sides of the respective boxes.

2. The machine set forth in claim 1 wherein:

said conveying means, said labeling station and said label supply stations therefor, and said label folding station and said wiping means thereof, on either side of said way are in discrete module form, with one of said modules being adjustably movable laterally of said way for accommodating boxes of varient lengths.

3. The machine set forth in claim 1 wherein:

said compressible pads are formed of a sponge material.

4. A machine for overlabeling both ends of a box, said machine comprising:

a processing way having entrance and exit ends, means for conveying the box to be labeled longitudinally of said way including means for disposing the box to extend transversely of said way whereby the box ends project to either side of said conveying means, said way including a labeling station and a label folding station in spaced apart relation therealong, a label supply station for each box end and means for feeding a label from the respective label supply stations to said labeling station, said label supply stations and said label feeding means for each box end being located relative to said conveying means to dispose the labels for each box end to have one end of same projecting toward the way and underlying the path of movement that the box end to be labeled thereby has when the box is moved along said way by said conveying means, and to have the other end of same project laterally of said way and said path endwise of the box end and away from said way, said labeling station including means for applying glue to the underside of the respective labels when received from said label supply station and means for rolling the respective said one ends of the respective labels onto the underside of the box as the box is moved through said labeling station, said label folding station including means for consecutively wiping the respective labels flush against said box ends for adhering same thereto, and for wiping the labels flush against the top side of the box for adhering same thereto, said conveying means, said labeling station and said label supply stations therefor, and said label folding station and said wiping means thereof, on either side of said way being in discrete module form, with one of said modules being adjustably movable laterally of said way for accommodating boxes of varient lengths.

* * * * *